United States Patent
Song

(10) Patent No.: US 8,863,094 B2
(45) Date of Patent: Oct. 14, 2014

(54) FRAMEWORK FOR A SOFTWARE ERROR INJECT TOOL

(75) Inventor: Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 12/782,634

(22) Filed: May 18, 2010

(65) Prior Publication Data

US 2011/0289487 A1 Nov. 24, 2011

(51) Int. Cl.
*G06F 9/44* (2006.01)
*G06F 11/36* (2006.01)

(52) U.S. Cl.
CPC ........ *G06F 11/3696* (2013.01); *G06F 11/3624* (2013.01)
USPC ............................ 717/130; 717/124; 717/127

(58) Field of Classification Search
CPC ............ G06F 11/3476; G06F 11/3672; G06F 11/3636; G06F 11/3612; G06F 11/3409; G06F 11/362; G06F 11/3684; G06F 11/3644
See application file for complete search history.

(56) References Cited

U.S. PATENT DOCUMENTS

| | | | |
|---|---|---|---|
| 5,701,487 A * | 12/1997 | Arbouzov ..................... | 717/124 |
| 5,732,273 A * | 3/1998 | Srivastava et al. ............ | 717/130 |
| 5,832,270 A | 11/1998 | Laffra et al. | |
| 5,963,740 A * | 10/1999 | Srivastava et al. ............ | 717/130 |
| 5,974,529 A * | 10/1999 | Zumkehr et al. ................ | 714/45 |
| 6,412,106 B1 | 6/2002 | Leask et al. | |
| 6,481,008 B1 * | 11/2002 | Chaiken et al. ............... | 717/130 |
| 6,701,460 B1 | 3/2004 | Suwandi et al. | |
| 6,823,507 B1 * | 11/2004 | Srinivasan et al. ............ | 717/152 |
| 7,020,803 B2 | 3/2006 | Wolin et al. | |
| 7,093,237 B2 | 8/2006 | Moser et al. | |
| 7,140,004 B1 * | 11/2006 | Kunins et al. ................. | 717/130 |
| 7,178,131 B2 | 2/2007 | Mitchell et al. | |
| 7,266,808 B2 * | 9/2007 | Kolawa et al. ................ | 717/130 |
| 7,293,213 B1 | 11/2007 | Xiao et al. | |
| 7,386,762 B1 | 6/2008 | Schoenthal et al. | |

(Continued)

FOREIGN PATENT DOCUMENTS

EP 0 388 526 B1 3/1996

OTHER PUBLICATIONS

Paul D. Marinescu et al.; An Extensible Technique for High-Precision Testing of Recovery Code; Feb. 18, 2012; retrieved online on Sep. 22, 2013; pp. 1-14; Retrieved from the Internet <URL: https://www.usenix.org/legacy/event/atc10/tech/full_papers/Marinescu.pdf>.*

(Continued)

*Primary Examiner* — Thuy Dao
*Assistant Examiner* — Hanh T Bui
(74) *Attorney, Agent, or Firm* — Janaki K. Davda; Konrad Raynes Davda & Victor LLP

(57) ABSTRACT

Provided are techniques for receiving an error inject script that describes one or more error inject scenarios that define under which conditions at least one error inject is to be executed and compiling the error inject script to output an error inject data structure. While executing code that includes the error inject, an indication that an event has been triggered is received, conditions defined in the one or more error inject scenarios are evaluated using the error inject data structure, and, for each of the conditions that evaluates to true, one or more actions defined in the error inject script for the condition are performed.

10 Claims, 17 Drawing Sheets

(56) References Cited

U.S. PATENT DOCUMENTS

| | | | |
|---|---|---|---|
| 7,401,322 B1 | 7/2008 | Shagam et al. | |
| 7,421,682 B2 | 9/2008 | Viehland et al. | |
| 7,464,373 B1 | 12/2008 | Yunt et al. | |
| 7,496,906 B2* | 2/2009 | Black-Ziegelbein et al. | 717/145 |
| 7,509,632 B2* | 3/2009 | Boger | 717/130 |
| 7,519,953 B2* | 4/2009 | Reissman et al. | 717/124 |
| 7,536,605 B2 | 5/2009 | Keaffaber et al. | |
| 7,587,639 B2 | 9/2009 | Marisetty et al. | |
| 7,793,261 B1* | 9/2010 | Edwards et al. | 717/124 |
| 7,823,134 B2 | 10/2010 | Agarwal et al. | |
| 7,823,135 B2* | 10/2010 | Horning et al. | 717/127 |
| 7,836,434 B1* | 11/2010 | Boucher | 717/127 |
| 7,945,898 B1 | 5/2011 | Episkopos et al. | |
| 8,024,708 B2* | 9/2011 | Demetriou et al. | 717/124 |
| 8,091,075 B2* | 1/2012 | Bates et al. | 717/127 |
| 8,166,464 B2* | 4/2012 | Lin et al. | 717/124 |
| 8,250,539 B2* | 8/2012 | Obata et al. | 717/124 |
| 8,296,739 B2 | 10/2012 | Kalla et al. | |
| 8,356,285 B2* | 1/2013 | Schuba et al. | 717/127 |
| 8,375,368 B2* | 2/2013 | Tuck et al. | 717/130 |
| 8,381,194 B2 | 2/2013 | Wang | |
| 8,387,022 B2* | 2/2013 | Horning et al. | 717/127 |
| 8,429,617 B2* | 4/2013 | Demetriou et al. | 717/124 |
| 8,458,650 B2* | 6/2013 | Andrade et al. | 717/130 |
| 8,516,443 B2* | 8/2013 | Li et al. | 717/127 |
| 8,640,100 B2* | 1/2014 | Neumann et al. | 717/124 |
| 8,667,471 B2* | 3/2014 | Wintergerst et al. | 717/130 |
| 2003/0088854 A1 | 5/2003 | Wygodny et al. | |
| 2003/0226062 A1 | 12/2003 | Gender et al. | |
| 2004/0199904 A1* | 10/2004 | Schmidt | 717/130 |
| 2005/0071606 A1 | 3/2005 | Talyansky et al. | |
| 2005/0071815 A1 | 3/2005 | Mitchell et al. | |
| 2005/0204344 A1 | 9/2005 | Shinomi | |
| 2005/0223363 A1* | 10/2005 | Black-Ziegelbein et al. | 717/127 |
| 2005/0268286 A1* | 12/2005 | Obata et al. | 717/124 |
| 2006/0112307 A1* | 5/2006 | Marisetty et al. | 714/11 |
| 2006/0156156 A1* | 7/2006 | Elnozahy | 714/746 |
| 2006/0271825 A1* | 11/2006 | Keaffaber et al. | 714/38 |
| 2007/0294671 A1* | 12/2007 | Demetriou et al. | 717/124 |
| 2007/0294681 A1* | 12/2007 | Tuck et al. | 717/149 |
| 2008/0178044 A1 | 7/2008 | Showalter et al. | |
| 2008/0189688 A1* | 8/2008 | Schmidt | 717/130 |
| 2008/0215925 A1 | 9/2008 | Degenaro et al. | |
| 2009/0249301 A1 | 10/2009 | Kalla et al. | |
| 2010/0153922 A1* | 6/2010 | Obata et al. | 717/124 |
| 2011/0047532 A1 | 2/2011 | Wang | |
| 2011/0289487 A1* | 11/2011 | Song | 717/130 |
| 2012/0042303 A1* | 2/2012 | Demetriou et al. | 717/127 |
| 2012/0096441 A1* | 4/2012 | Law et al. | 717/127 |
| 2012/0151453 A1* | 6/2012 | Finking et al. | 717/130 |
| 2012/0180030 A1* | 7/2012 | Crutchfield et al. | 717/149 |
| 2012/0222012 A1* | 8/2012 | Song | 717/124 |
| 2012/0317553 A1* | 12/2012 | Schmidt | 717/130 |
| 2013/0159964 A1 | 6/2013 | Szpak | |
| 2013/0205281 A1* | 8/2013 | Pizlo et al. | 717/128 |

OTHER PUBLICATIONS

Andrew Dinn; Flexible, Dynamic Injection of Structured Advice using Byteman; ACM; 2011; retrieved online on Sep. 22, 2013; pp. 41-50. Retrieved from the Internet <URL: http://delivery.acm.org/10.1145/1970000/1960325/p41-dinn.pdf?>.*

Henrique Madeira et al.; On the Emulation of Software Faults by Software Fault Injection; IEEE 2000; retrieved online on Sep. 22, 2013; pp. 1-10; Retrieved from the Internet <URL: http://ieeexplore.ieee.org/stamp/stamp.jsp?tp=&arnumber=857571>.*

Lwin Khin Shar et al.; Mining SQL Injection and Cross Site Scripting Vulnearbilities using Hybrid Program Analysis; 2013; IEEE; pp. 642-651; retrieved online on Feb. 8, 2014; Retrieved from the Internet: <URL: http://delivery.acm.org/10.1145/2490000/2486873/p642-shar.pdf?>.*

Marcello Cinque et al.; An Effective Approach for Injecting Faults in Wireless Sensor Network Operating Systems; 2010; IEEE; pp. 567-569; retrieved online on Feb. 8, 2014; Retrieved from the Internet: <URL: http://ieeexplore.ieee.org/stamp/stamp.jsp?tp=&arnumber=5546777>.*

Gaurav S. Kc et al.; Countering Code-Injection Attacks With Instruction-Set Randomization; 2003; ACM; pp. 272-280; retrieved online on Feb. 8, 2014; Retrieved from the Internet: <URL: http://delivery.acm.org/10.1145/950000/948146/p272-kc.pdf?>.*

Patrick E. Lanigan et al.; Experiences with a CANoe-based Fault Injection Framework for AUTOSAR; 2010; retrieved online on May 12, 2014; pp. 1-6. Retrieved from the Internet: <URL: http://users.ece.cmu.edu~planigan/research/lanigan-dsn10.pdf>.*

Chen Fu et al.; Robustness Testing of Java Server Applications; Apr. 2005; IEEE; retrieved online on May 12, 2014; pp. 292-311; Retrieved from the Internet: <URL: http://ieeexplore.ieee.org/stamp/stamp.jsp?tp=&arnumber=1435351>.*

Pieter Philippaerts et al.; CPM: Masking Code Pointers to Prevent Code Injection Attacks; Jun. 2013; ACM; retrieved online on May 12, 2014; pp. 1-27; Retrieved from the Internet: <URL: http://delivery.acm.org/10.1145/2490000/2487223/a1-philippaerts.pdf?>.*

Preliminary Amendment dated May 7, 2012, pp. 1-5, for U.S. Appl. No. 13/465,736, filed May 18, 2010, entitled "Framework for Software Error Inject Tool", by inventor C. Song.

U.S. Appl. No. 13/465,736, filed May 7, 2012, entitled "Framework for Software Error Inject Tool", by inventor C. Song, pp. 1-39.

J.A. Clark, et al., "Fault Injection: A Method for Validating Computer-System Dependability", IEEE, 1995, pp. 47-56.

J. Aidemark, et al., "GOOFI: Generic Object-Oriented Fault Injection Tool", IEEE, 2001, pp. 83-88.

Notice of Allowance dated Jan. 1, 2014, pp. 18, for US U.S. Appl. No. 13/465,736 filed May 18, 2010.

U.S. Appl. No. 14/142,188, filed Dec. 27, 2013, pp. 39.

Preliminary Remarks dated Dec. 27, 2013, pp. 2, for U.S. Appl. No. 14/142,188, filed Dec. 27, 2013.

U.S. Appl. No. 14/142,207, filed Dec. 27, 2013, pp. 38.

Preliminary Remarks dated Dec. 27, 2013, pp. 2, for U.S. Appl. No. 14/142,207, filed Dec. 27, 2013.

S. Dawson, et al., "Probing and Fault Injection of Protocol Implementations", 1995; IEEE; retrieved online on Dec. 17, 2013; pp. 351-359; retrieved from internet: <URL:http://ieeexplore.ieee.org/stamp/stamp.jsp? tp=&arnumber=500039>.

J. Trevor, et al., "Defeating Script Injection Attacks with Browser-Enforced Embedded Policies", 2006; University of Maryland, Department of Computer Science; retrieved online on Dec. 17, 2013; pp. 1-10; retrieved from the internet: <URL:http://drum.lib.umd.edu/bitstream/1903/4008/1/paper.pdf>.

J. Perkins, et al., "Automatically Patching Errors in Deployed Software"; ACM; 2009; retrieved online on Dec. 30, 2013; pp. 87-102; retrieved from the internet: <URL:http://delivery.acm.org/10.1145/1630000/1629585/p87-perkins.pdf?>.

Preliminary Amendment dated Nov. 19, 2013, pp. 24, for U.S. Appl. No. 13/465,736, filed May 18, 2010.

D.T. Stot, "Automated Fault-Inject Based Dependability Analysis of Distributed Computer Systems", 2000, retrieved online on Apr. 16, 2014, pp. 1-52, retrieved from the internet<URL:http//citeseerx.ist.psu.edu/viewdoc/download? doi=10.1.1.43.2448&rep=rep1&type=pdf>.

B.T. Nassu, et al., "Injecting Inconsistent Values Caused by Interaction Faults for Experimental Dependability Evaulation", IEEE, 2008, retrieved onlie on Apr. 16, 2014, pp. 3-12, retrieved from the internet<URL:http://ieeexplore. ieee.org/stamp/stamp.jsp?tp=&arnumber=4555985>.

C.C. Kane, et al., "Declarative Error Management for Robust Data-Intensive Applications", ACM, 2012, retrieved online on Apr. 16, 2014, pp. 205-216, retrieved from the internet<URL:http://delivery.acm.org/10.1145/2213860/p205-kanne.pdf?>.

Notice of Allowance dated Apr. 28, 2014, pp. 11, for U.S. Appl. No. 13/465,736, filed May 18, 2010.

* cited by examiner

| Syntax | Description |
|---|---|
| EVENT *symbol* := *value*; | Declare an event symbol and binds the event value to the symbol. |
| COUNTER *symbol* [ := *value* ]; | Declare a counter symbol. |
| STATE *symbol* (*symbol*, ...) [ := *stateSymbol* ]; | Declare a state symbol and its associated state. The initial state can also be specified as part of the declaration. |
| CONSTANT *symbol* := *value*; | Declare a constant symbol and binds the constant to the symbol. |
| TIMER *symbol* [ := *value* ]; | Declare a timer symbol. Timer has second resolution. Timer symbol returns TRUE in condition expression when the timer expired.<br>Timer is disabled by default if it is not initialized. |
| TIMER_RESOLUTION := *value* ; | Define the timer resolution in number of seconds. |

```
EVENT WarmstartPhase0 := 0x100;  # Binds event ID 0x100 to
                                 # symbol WarmstartPhase0

STATE Machine ( IML, online, WS, FB ) := IML;
         # 'Machine' state variable can have IML, online, WS
         # FB as a state. It is initialized with IML state.

TIMER WS_timer := 8;  # define a timer and set the timer to
                      # expire 8 seconds later
```

```
(WarmstartPhase0) {MESSAGE "Warmstart happened";}
    # WS phase 0 event fired
(WarmstartPhase0 >= 55) {MESSAGE "Warmstart happened";}
    # WS phase 0 event fired with event data >= 55
```

| Action | Description |
|---|---|
| ARM *eventSymbol* [, ...]; | Arm one or more events for trigger. |
| DISARM *eventSymbol* [, ...]; | Disarm one or more events. |
| INCREMENT *counterSymbol* BY *value*; | Increment a counter by the specified value. The max adjust value is 0xffff. |
| DECREMENT *counterSymbol* BY *value*; | Decrement a counter by the specified value. . The max adjust value is 0xffff. |
| *counterSymbol* := *value*; | Assign the counter with the specified value. |
| *stateSymbol* := *state*; | Assign the state symbol to contain the specified state. |
| *timerSymbol* := *value*; | Assign the timer with the specified number of seconds pass the current time. |
| OPERATION *value*; | A triggered event can return a non-zero return value for the event macro to allow the caller of event macro to specify associated operations based on the returned value. This action can be used to specify the return value of the current triggered event. If more than one OPERATION actions are specified for an event, then only one of the return value is used. |
| TIMER_RESOLUTION *value*; | Specify the resolution of the timer. The unit is second. |
| MESSAGE "*string*"; | Display message to ATE. |
| WARMSTART; | Perform warmstart. |
| CRASHLOCAL; | Crash the local cluster. |
| CRASHREMOTE; | Crash the remote cluster. |
| HARDWARE_INJECT *value*; | Perform a particular HW inject. |
| DISABLE_TIMER *timer*; | Disable a timer. |

FIG. 6

```
700
/
EVENT start_warmstart := 0x123; # suppose event 0x123 is at the
# beginning of warmstart.
EVENT end_warmstart  := 0x124; # End of warmstart.
TIMER ws_timer;

(INIT) {
ARM start_warmstart, end_warmstart; # Need WS events.
}

(start_warmstart) {
DISARM start_warmstart;
ws_timer := 8; # Set a 8 seconds timer.
TIMER_RESOLUTION := 1; # set timer resolution to 1 second.
}

(ws_timer) {
DISABLE_TIMER ws_timer;
DISARM end_warmstart;
MESSAGE "Warmstart did not finished in 8 seconds.";
}

(end_warmstart) {
DISABLE_TIMER ws_timer;
DISARM end_warmstart;
MESSAGE "Warmstart finished within 8 seconds.";
}
```

FIG. 7

- The first data element: 800, 810

| | Byte 0 | Byte 1 | Byte 2 | Byte 3 |
|---|---|---|---|---|
| Word 0 | First node (type=1) | Timer resolution | Total number of elements | |
| Word 1 | Index of the 1st action group | | Number of action groups | |

- The action group 812

| | Byte 0 | Byte 1 | Byte 2 | Byte 3 |
|---|---|---|---|---|
| Word 0 | type = 2 | Active flag = 0 | Index to the predicate tree or leaf | |
| Word 1 | Index to the action list or leaf | | | |

Active flag is used by interpreter. Compiler should set this field to 0.
Note: action group should all be in consecutive elements

- The predicate tree element 814

| | Byte 0 | Byte 1 | Byte 2 | Byte 3 |
|---|---|---|---|---|
| Word 0 | type=3 | Logical op | Index of left branch or 0 | |
| Word 1 | Index of right branch or 0 | | | |

Logical operator:
AND: 1, OR: 2, NOT: 3 (only left branch is used)

FIG. 8A

- The predicate tree leaf element  ⌐816

| | Byte 0 | Byte 1 | Byte 2 | Byte 3 |
|---|---|---|---|---|
| Word 0 | type=4 | Comparison op | Index of oprand (as the 1st oprand) | |
| Word 1 | Immediate data for comparison | | | |

Comparison operators:
Equal to (=): 1, Equal to or less than (<=): 2, Equal to or greater than (>=): 3, Less than (<): 4, Greater than (>): 5, Not equal to (<>): 6

- The predicate tree leaf element for event ID  ⌐818

| | Byte 0 | Byte 1 | Byte 2 | Byte 3 |
|---|---|---|---|---|
| Word 0 | type=5 | Comparison op | reserved | |
| Word 1 | Immediate data for comparison (as the 2nd oprand) | | | |

- The predicate tree leaf element for event data  ⌐820

| | Byte 0 | Byte 1 | Byte 2 | Byte 3 |
|---|---|---|---|---|
| Word 0 | type=6 | Comparison op | reserved | |
| Word 1 | Immediate data for comparison (as the 2nd oprand) | | | |

- The predicate tree leaf element for timer  ⌐822

| | Byte 0 | Byte 1 | Byte 2 | Byte 3 |
|---|---|---|---|---|
| Word 0 | type=7 | Comparison op | Index of timer (as the 1st oprand) | |
| Word 1 | Reserved | | | |

- The predicate tree leaf element for init
  This node is only evaluated to TRUE at load time.  ⌐824

| | Byte 0 | Byte 1 | Byte 2 | Byte 3 |
|---|---|---|---|---|
| Word 0 | type=8 | Reserved | Reserved | |
| Word 1 | Reserved | | | |

- The counter action node  ⟵ 830

|        | Byte 0       | Byte 1    | Byte 2                        | Byte 3 |
|--------|--------------|-----------|-------------------------------|--------|
| Word 0 | type=10      | Operation | Index of the next action or 0 |        |
| Word 1 | Action data  |           | Index of the counter          |        |

Operation:
Increment: 1, Decrement: 2.

- The action node for counter, state, and timer assignment  ⟵ 832

|        | Byte 0           | Byte 1   | Byte 2                        | Byte 3 |
|--------|------------------|----------|-------------------------------|--------|
| Word 0 | type=11          | Reserved | Index of the next action or 0 |        |
| Word 1 | Assignment data  |          | Index of the oprand           |        |

- The action node for counter, state, and timer assignment (Long format)  ⟵ 834

|        | Byte 0           | Byte 1   | Byte 2                        | Byte 3 |
|--------|------------------|----------|-------------------------------|--------|
| Word 0 | type=12          | Reserved | Index of the next action or 0 |        |
| Word 1 | Reserved         |          | Index of the oprand           |        |
| Word 2 | Assignment data  |          |                               |        |
| Word 3 | Reserved         |          |                               |        |

Note: long format takes up 2 consecutive elements. The long format allow 32bit assignment data.

- The action node for message  ⟵ 836

|        | Byte 0                                         | Byte 1   | Byte 2                        | Byte 3 |
|--------|------------------------------------------------|----------|-------------------------------|--------|
| Word 0 | type=13                                        | Reserved | Index of the next action or 0 |        |
| Word 1 | Byte offset to null terminated message data.   |          |                               |        |

FIG. 8D

- The timer node 808 838

|  | Byte 0 | Byte 1 | Byte 2 | Byte 3 |
|---|---|---|---|---|
| Word 0 | type=14 | Reserved | reserved | |
| Word 1 | Timer value<br>Contain 0xffffffff for un-initialized timer. At load time, the timer value should be adjusted to be as though it is done by assign statement. | | | |

- The state and counter node 840

|  | Byte 0 | Byte 1 | Byte 2 | Byte 3 |
|---|---|---|---|---|
| Word 0 | type=15 | Reserved | reserved | |
| Word 1 | Value | | | |

- The action node for disable timer 842

|  | Byte 0 | Byte 1 | Byte 2 | Byte 3 |
|---|---|---|---|---|
| Word 0 | type=18 | Reserved | Index of the next action or 0 | |
| Word 1 | | | Index of the oprand | |

FIG. 8E

FRAMEWORK FOR A SOFTWARE ERROR INJECT TOOL

BACKGROUND

1. Field

Embodiments of the invention relate to a framework for a software error inject tool.

2. Description of the Related Art

For a complex and highly resilient computerized system (e.g., one in which a majority of the functions are implemented by computer programs), it may be difficult to create conditions to naturally exercise certain code paths, such as error code paths. This creates challenges for software development and quality assurance.

A common conventional approach is to implement error inject code (including test scenario code and error injects) embedded within normal code (i.e., code that is compiled and executed). Error inject code may be described as one or more computer programs that add erroneous behavior to the normal program when they are executed. This is done to test possible error conditions. Then, depending on how safe the implementation is (i.e., how easily the error inject code could be incorrectly executed as part of the normal code, and, when the error inject code is executed by mistake, how large the damage is to the computerized system), runtime switches or conditional compiles are used to enable the error inject code. An error inject may be described as execution of the error inject code or other method that can cause the computerized system to exhibit erroneous behavior. Runtime switches may be described as inputs to the computer program to cause the computer program to execute in different paths. Conditional compiles may be described as compile time switches that cause a compiled program to execute in different paths. So, the cost of repeating and/or running a series of different error injects may be high, especially for a large computerized system. This is because it may take some time to recompile and restart such a large computerized system.

Also, for a complex error inject that involves multiple error inject points, the current conventional approach tends to make the error inject code so unique that it becomes hard to re-use the error inject code.

Also, when error inject code is embedded in normal code to do the error injects, when a different error inject or different condition is needed, the embedded error inject code needs to be modified and recompiled. This makes it more difficult to iterate through different test scenarios in the test process.

Thus, there is a need for a framework for a software error inject tool.

BRIEF SUMMARY

Provided are a method, computer program product, and system for receiving an error inject script that describes one or more error inject scenarios that define under which conditions at least one error inject is to be executed and compiling the error inject script to output an error inject data structure. While executing code that includes the error inject, an indication that an event has been triggered is received, conditions defined in the one or more error inject scenarios are evaluated using the error inject data structure, and, for each of the conditions that evaluates to true, one or more actions defined in the error inject script for the condition are performed.

BRIEF DESCRIPTION OF THE SEVERAL VIEWS OF THE DRAWINGS

Referring now to the drawings in which like reference numbers represent corresponding parts throughout:

FIG. 3 illustrates a table with sample syntax for a declaration in accordance with certain embodiments.

FIG. 4 illustrates a sample declaration in accordance with certain embodiments.

FIG. 5 illustrates sample conditions in accordance with certain embodiments.

FIG. 6 illustrates a sample table of actions in accordance with certain embodiments.

FIG. 7 illustrates a sample scenario to verify that a warm-start finished in eight seconds in accordance with certain embodiments FIG. 8 is formed by the sequence of figures FIG. 8A, FIG. 8B, FIG. 8C, FIG. 8D, and FIG. 8E.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
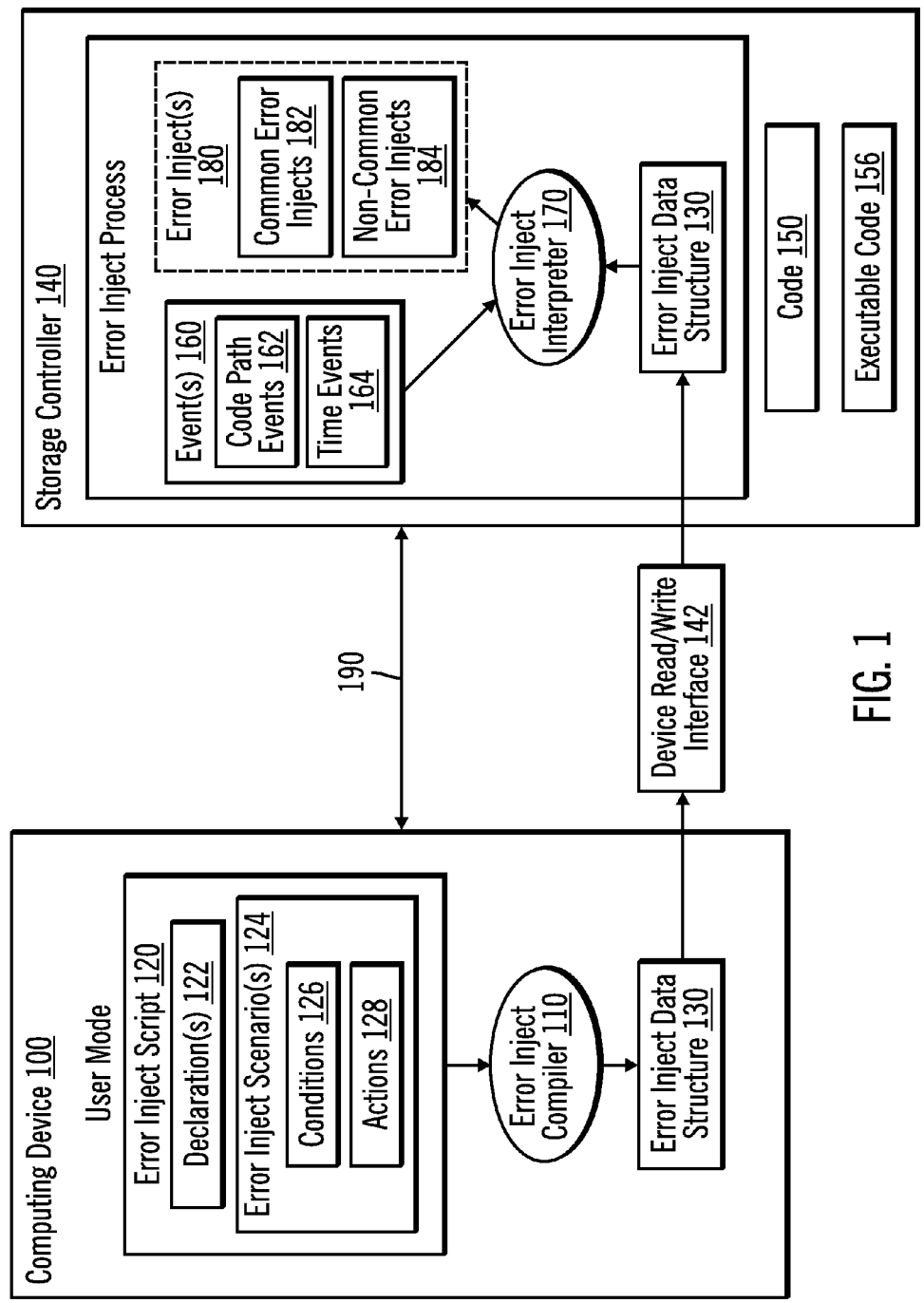
FIG. 1 illustrates a system architecture in accordance with certain embodiments.

FIG. 1 illustrates a system architecture in accordance with certain embodiments. A computing device 100 is coupled to a storage controller 140 via a communication path 190. The communication path 190 may comprise any type of communication path, such as, for example, a peer-to-peer network, spoke and hub network, Storage Area Network (SAN), a Local Area Network (LAN), Wide Area Network (WAN), the Internet, an Intranet, etc.

With embodiments, an error inject tool may be said to consist of a user mode that includes an error inject compiler 110 and an error inject process that includes an error inject interpreter 170. In the user mode, the error inject compiler 110 (e.g., a user mode program) takes the error inject script 120 as input and compiles the error inject script 120 to produce an error inject data structure 130 that can be processed by the error inject interpreter 170. The error inject interpreter 170 may also be referred to as an embedded interpreter.

A device read/write interface 142 reads the error inject data structure 130 at the computing device 100 and copies the error inject data structure 130 to the storage controller 140. In certain embodiments, the read/write interface 142 is part of the storage controller 140.

The error inject interpreter 170 runs under the storage controller 140. The error inject interpreter 170 uses the error inject data structure 130, which is the output of the error inject compiler 110, and one or more events 160 to determine when to inject particular errors (i.e., when to execute one or more error injects 180). The error injects 180 include common (pre-defined) error injects 182 and non-common (i.e., customized or embedded) error injects 184. In certain embodiments, non-common error injects 184 may be described as being customized by a programmer.

Figure 2:
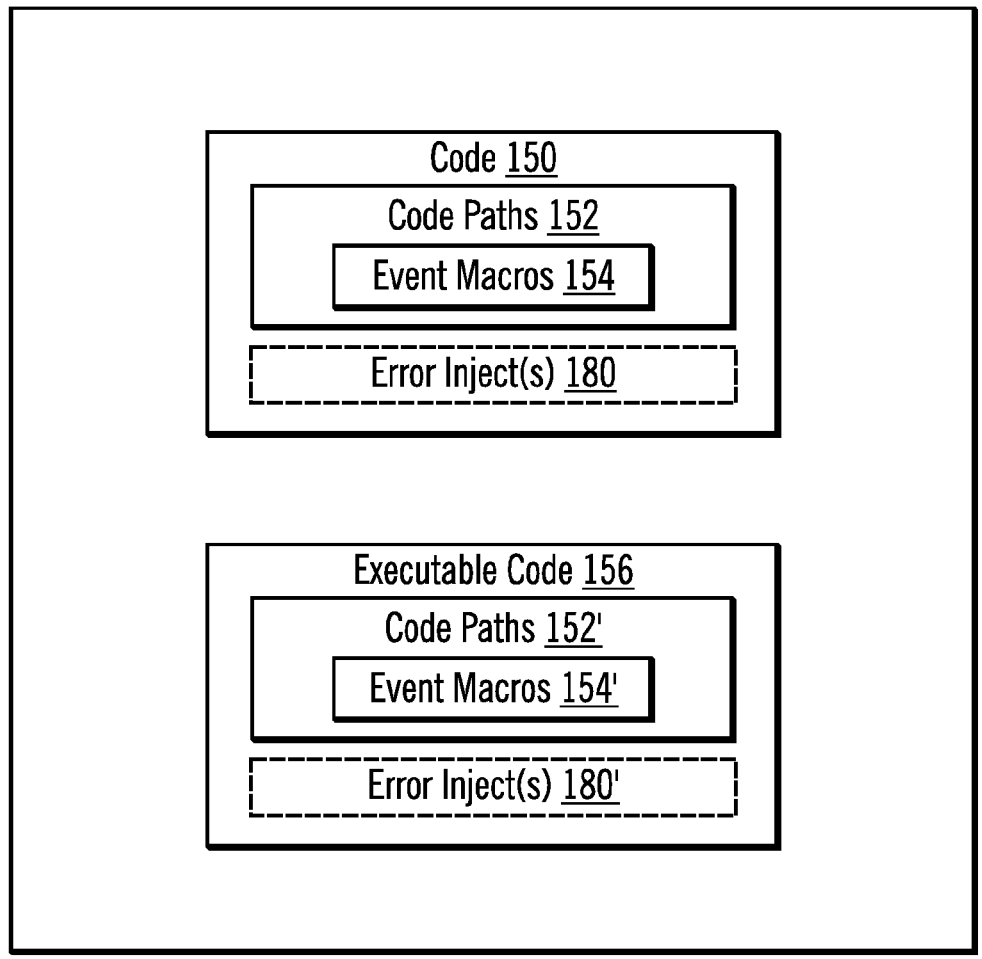
FIG. 2 illustrates further details of code in accordance with certain embodiments.

The storage controller 140 includes code 150 and executable code 156. FIG. 2 illustrates further details of code 150, 156 in accordance with certain embodiments. The code 150 may be said to include code paths 152 and error injects 180. The code paths 152 include event macros 154. An event macro 154 may be described as a statement in the code path 152. The code 150 is compiled to create the executable code 156, which is executed to test the erroneous behavior. The executable code 156 includes code paths 152', which include event macros 154', and error injects 180'. In certain embodiments, the executable code 156 may be said to include the error inject interpreter 170, common error injects 182, and non-common error injects 184.

Thus, embodiments provide a framework for adding software error inject code to code 150. Code 150 may be described as "normal" code or code that was not written to include such error inject code in a manner that avoids recompilation and restarting of the executable code 156. With embodiments, the error inject scenarios 124 and common error injects 182 (e.g., warmstart and failover) are separated from the inject locations and non-common error injects 184. A warmstart process may be described as a self correcting process in which there is resumption of operation of the storage controller 140, following a problem-generated shutdown, in which the code 150 running on the storage controller 140 can resume at the point at which it was at when the shutdown occurred and data is not lost. A failover process may be described as one in which processing is switched from the storage controller 140 to another storage controller (not shown in FIG. 1).

Also, the inject locations and, if needed, the non-common error injects 184 are coded in to the code 150, and these code segments of inject locations are not executed without driving the error inject scenarios 124. That is, the non-common error injects 184 are executed when an event 160 occurs and the error inject interpreter 170 determines which, if any, of the non-common error injects 184 are to be executed.

The error inject scenarios 124 and conditions under which error injects 180 are to be executed are specified in the error inject scripts 120 using an error inject specification language. When the error inject data structure 130 (i.e., the compiled error inject script 120) is loaded into the storage controller 140, the storage controller 140 activates the events 160 and controls the error injects 180 as described by the error inject script 120.

With embodiments, the framework for the error inject tool provides a convenient environment for users to specify an error inject scenario 124 of error injects 180. That is, the error inject scenario 124 describes under what conditions both common error injects 182 and non-common error injects 184 should be executed. The common error inject 182 behavior is defined by the error inject interpreter 170, while the non-common error inject 184 behavior is defined by programmers. In certain embodiments, the error inject tool may be said to include the error inject compiler 110 and the error inject interpreter 170. The error inject scenario 124 is described by an error inject script 120 that describes one or more error injects 180. For each error inject 180, the error inject script 120 allows users to describe when and under what conditions to inject particular errors into the code 150.

Thus, embodiments describe a software error inject tool for a storage controller 140 and specification language understood by the storage controller 140. In certain embodiments, the storage controller 140 is a multi-processor, multi-threaded system with self-healing capability through warmstart process. To make sure that the storage controller 140 can perform all recovery functions correctly, embodiments enable injecting errors at all possible system states.

The error inject script 120 consists of two parts: one or more declarations 122 and one or more error inject scenarios 124, which are described using an error inject specification language.

With embodiments, the declaration 122 is used to declare and define programming elements that will be used in the error inject script 120 for error injects. With embodiments, the programming elements include events, counters, states, constants, and timers. As an example, states may be defined for cluster status Initial Microcode Load (IML), warmstart, operational (i.e., running in normal state), and shutdown. With embodiments, the declarations 122 come before other non-declaration statements in the scrip 120. With embodiments, the error inject scenario 124 is used to define one or more conditions and their associated error inject actions. In certain embodiments, the specification language is an event driven language (i.e., is not a procedural language), and the order of the statements do not represent the execution order.

FIG. 3 illustrates a table 300 with sample syntax for a declaration 122 in accordance with certain embodiments. The declaration 122 is used to define programming elements. The initial value of each programming element may also be set as part of the declaration 122. In table 300, the keywords are: EVENT, COUNTER, STATE, CONSTANT, TIMER, and TIMER RESOLUTION.

In certain embodiments, symbols may have alphanumeric and '_' characters, except for the first character, which is not a number. In certain embodiments, the statements end with a ';' character. In certain embodiments, the statements in square brackets ([ ]) are optional. In certain embodiments, the symbols are in one name space.

In certain embodiments, the values are positive numbers ranging from 0 to 0xffffffff, and hexadecimal (hex) numbers are indicated by the leading '0x'. In certain embodiments, the values may be expressed by constant symbols once they are defined. In certain embodiments, comments are started with a '#' character, and the comments extend to the end of the line.

FIG. 4 illustrates a sample declaration 400 in accordance with certain embodiments. In the declaration 400, the EVENT is a WarmstartPhase0, the STATE is Machine, and the TIMER is WS_Timer.

In certain embodiments, the error inject scenario 124 is defined by one or more condition-action pair statements. The syntax for an error inject scenario 124 is a statement having: (conditions) {actions}. Each time that an event 160 occurs (e.g., an armed event macro 154 is invoked) or a timer update occurs, the conditions are evaluated by the error inject interpreter 170. A statement with a true condition will have its associated actions carried out. The actions may change states or counters that cause more conditions to become true, and this will trigger more actions to be performed. In certain embodiments, however, an action is executed at most once for each event or timer update.

In certain embodiments, events and timers are two external sources that cause the conditions to change. In certain embodiments, there are two techniques to specify event conditions. In a first technique, an event condition is specified by an event symbol in a predicate without any comparison operators. The event symbol is evaluated to true if the event 160 is armed and the event macro 154 is invoked.

In a second technique, the event condition is specified with the event symbol with comparison operators in a predicate. The predicate is evaluated to true when the event 160 is armed, the event macro 154 is invoked, and the event data as the value of the event symbol makes the predicate true. With embodiments, INIT (i.e., initialization) is a predefined condition that is TRUE when the error inject script 120 is loaded, and INIT is FALSE other times.

FIG. 5 illustrates sample conditions 500 in accordance with certain embodiments. The first condition, (WarmstartPhase0), is an example of use of the first technique. The second condition, (WarmstartPhase0>=55), is an example of use of the second technique.

Actions 128 are operations that can be performed when an associated condition 126 is evaluated to TRUE. FIG. 6 illustrates a sample table 600 of actions in accordance with certain embodiments.

FIG. 7 illustrates a sample scenario 700 to verify that a warmstart finished in eight seconds in accordance with certain embodiments. In scenario 700, two EVENTS are defined: start_warmstart and end_warmstart. In the scenario 700, the events are assigned with identifier (ID) values of 0x123 and 0x124, respectively. One timer is defined with the symbol ws_timer. At load time, both events are armed. Upon triggering of the start_warmstart event, the start_warmstart event is disarmed, and the ws_timer is set to have resolution of 1 second and to expire in 8 seconds. Upon triggering of the ws_timer (i.e. end_warmstart does not happen within 8 second), the timer is disabled, the end_warmstart event is disarmed, and a message of "Warmstart did not finished in 8 seconds" is issued to indicate that the test failed. Upon triggering the end_warmstart event, the timer is disabled, the end_warmstart event is disarmed, and a message of "Warmstart finished within 8 seconds" is issued to indicate that the test completed successfully.

The data structure is 130 produced by error inject compiler 110 and serves as input to the error inject interpreter 170. In certain embodiments, the error inject data structure 130 is in a form that can be executed directly by the error inject interpreter 170.

The declaration 122 is used to declare and define programming elements that are used in the error inject script 120 for error injects. Data elements in the error inject data structure 130 represent (i.e., correspond to) the programming elements that have been translated to the error inject data structure 130. Thus, the error inject data structure 130 contain multiple data elements.

Figure 8C:
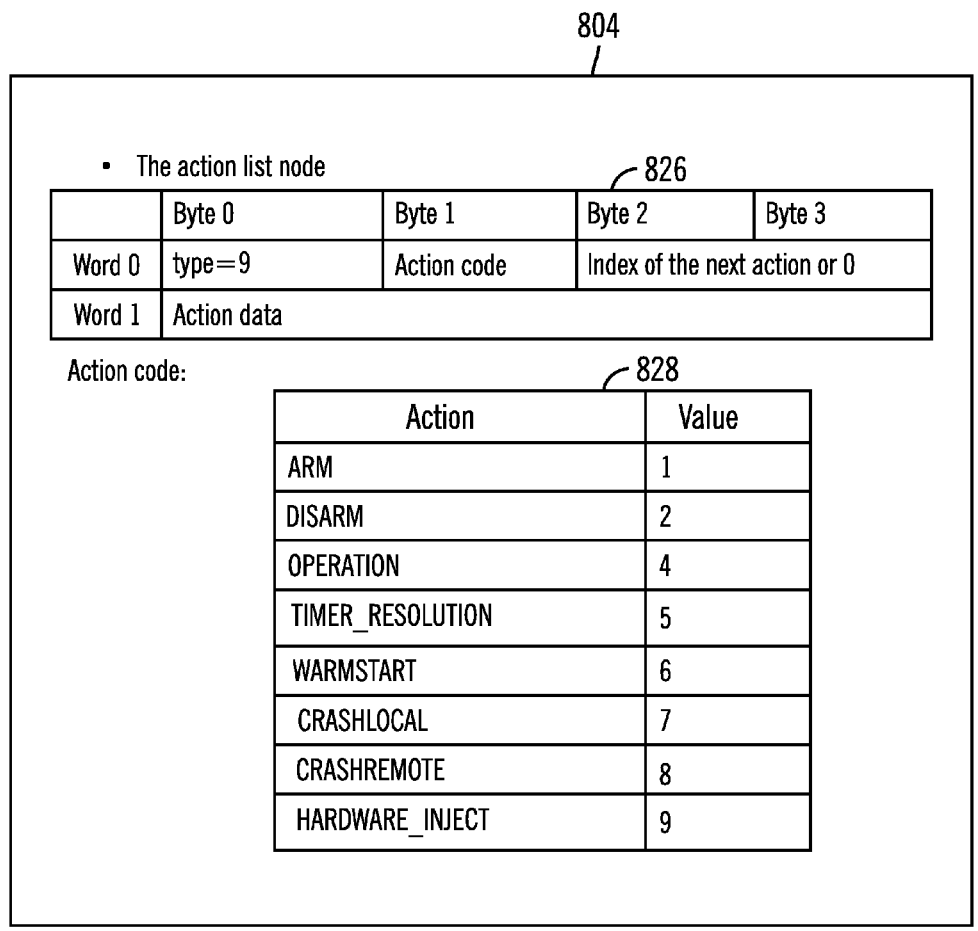
FIG. 8 illustrates a sample format of a data structure in accordance with certain embodiments.

In certain embodiments, the first part of the error inject data structure 130 is an array of data elements, and each data element takes up two 32 bit words, with the layout being different depending on the type of the data element. FIG. 8 illustrates a sample format 800, 802, 804, 806, 808 of the error inject data structure 130 in accordance with certain embodiments. FIG. 8 is formed by the sequence of figures FIG. 8A, FIG. 8B, FIG. 8C, FIG. 8D, and FIG. 8E.

In FIG. 8A, the format of a first data element 810 includes a first node, a timer resolution, a total number of elements, an index of the first action group, and a number of action groups. In FIG. 8A, the format of an action group 812 includes a type, an active flag, an index to the predicate tree or leaf, and an index to the action list or leaf. In FIG. 8A, the format of a predicate tree element 814 includes a type, a logical operation, an index of the left branch or zero, and an index of the right branch or zero.

In FIG. 8B, the format of a predicate tree leaf element 816 includes a type, a comparison operation, an index of an operand (as the first operand), and immediate data for comparison. In FIG. 8B, the format of a predicate tree leaf element for an event ID 818 includes a type, a comparison operator, and immediate data for comparison (as the second operand). In FIG. 8B, the format of a predicate tree leaf element for event data 820 includes a type, a comparison operator, and immediate data form comparison (as the second operand). In FIG. 8B, the format of a predicate tree leaf element for a timer 822 includes a type, a comparison operator, and an index of the timer (as the first operand). In FIG. 8B, the format of a predicate tree leaf element for init 824 includes a type.

In FIG. 8C, the format of an action list node 826 includes a type, an action code, an index of the next action or zero, and action data. Example action codes 828 are also illustrated in FIG. 8C.

In FIG. 8D, the format of a counter action node 830 includes a type, an operation, an index of the next action or zero, action data, and an index of the counter. In FIG. 8D, the format of an action node for counter, state, and timer assignment 832 includes a type, an index of the next action or zero, assignment data, and an index of the operand. In FIG. 8D, the format of an action node for counter, state, and timer assignment (long format) 834 includes a type, an index of the next action or zero, an index of the operand, and assignment data. In FIG. 8D, the format of an action node for a message 836 includes a type, an index of the next action or zero, and a byte offset to null terminated message data.

In FIG. 8E, the format of a timer node 838 includes a type and a timer value. In FIG. 8E, the format of a state and counter node 840 includes a type and a value. In FIG. 8E, the format of an action node for disable timer 842 includes a type, an index of the next action or zero, and an index of the operand.

Figure 9:
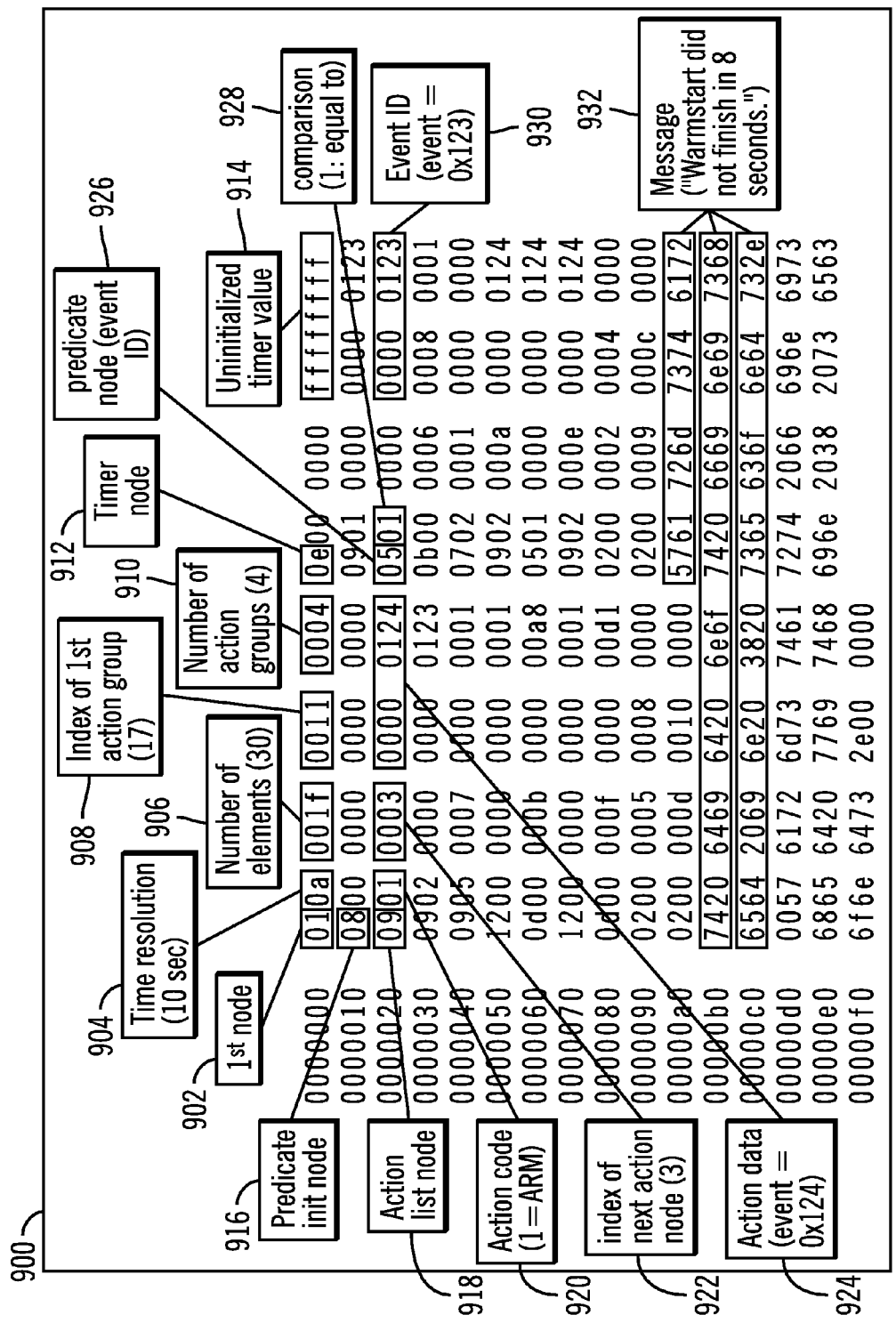
FIG. 9 illustrates a sample data structure in accordance with certain embodiments.

FIG. 9 illustrates a sample data structure 900 in accordance with certain embodiments. In this example, the error inject compiler 110 compiles the error inject script including scenario 600 and outputs data structure 900. As an example, the data structure 900 includes a first node 902, a time resolution (10 seconds) 904, a number of elements 906, an index of a first action group 908, a number of action groups (4) 910, a timer node 912, an unitialized timer value 914, a predicate init node 916, an action list node 918, an action code (1=arm) 920, an index of a next action node (3) 922, action data (event=0x124) 924, a predicate node (event ID) 926, a comparison (1: equal to, where the value "1" has been encoded to represent "equal to") 928, event ID (event=0x123), and a message (e.g., "Warmstart did not finish in 8 seconds.") 932.

In certain embodiments, the events 160 (e.g., program events) are storage controller events and serve as input to the error inject interpreter 170. In certain embodiments, there are two types of events 160: code path events 162 and time events 164.

A code path event 162 represents a particular code path 152. The code path events 162 are generated or triggered by event macros 154, which are included in the code paths. A code path event 162 is identified by an event identifier (ID). Even though the storage controller 140 may generate more than one code path event 162 at a same time, those code path events 162 are processed in serial by the error inject interpreter 170.

When invoked, an event macro 154 does not necessarily generate a code path event 162. The code path event 162 is generated when the code path event 162 is armed by the error inject script 120. The error inject script 120 can also disarm a code path event 162 when the code path event 162 is no longer of interest to the error inject scenario 120. In certain embodiments, by default, right after an error inject script 120 is loaded, all code path events 162 are not armed.

Code path events 162 can also carry data. The data is specified as a parameter for the event macro 154. The event data can be used by the error inject error inject script 120 data structure 130 to fine tune the conditions.

Time events 164 are related to the progress of time (e.g., relative to some event, such as a code path event). Relative timers may be used by the error inject script to generate time events 164. Unlike code path events 162, multiple time events 164 may happen with or without the code path event 162.

Time events 164 do not need to be armed. A time event 164 is enabled when the time event 164 is initialized. The time event 164 can be initialized when the time event 164 is declared (i.e., initialized as part of the load). Time events 164 can also be disabled.

The error inject script 120 may be described as specifying the behavior of an error inject test. After being compiled, the error inject script 120 is converted into the error inject data structure 130 that is understood by the error inject interpreter 170. So, at runtime (i.e., when the executable code 156 is executing), after the data structure 130 is loaded, the user mode (i.e., blocks 100-130 of FIG. 1) is not involved.

The error injects 180 include both common error injects 182 and non-common error injects 184. The common error injects 182 are executed by the error inject interpreter 170. The embedded error injects 184 are executed when thread control is returned from the event macro 154 to the executing code.

The event macro 154 may be defined as:

OS_ERRORINJECT(EventId,data)

The event macro 154 defines a code path event 162 that can serve as a trigger to the error inject interpreter 170. In certain embodiments, the event macro 154 returns an integer value. For example, when the code path event 162 is disarmed, the event macro 154 returns zero ("0"); otherwise, when the code path event 162 is triggered, the event macro 154 returns a value as specified by the error inject script 120 or zero if not specified. The returned value can be used to decide which, if any, embedded associated error injects 180 are to be carried out.

The error inject script 120 may also define error injects with conditions on the triggered events and other conditions based on timers, states, and counters. When the conditions are met, the corresponding error injects on the error inject script 120 will be carried out before the embedded associated operations in the code 150. In certain embodiments, the event macro 154 returns zero ("0") when the event is triggered but there is no condition met.

The following is an example event macro 154:

```
if (OS_ERRORINJECT(OS_WARMSTART_PHASE0, 1)) {
    /* error inject operation */
    ...
}
```

In the OS_ERRORINJECT event macro 154, the EventId is an enumeration that may be shared. In certain embodiments, components allocate enumeration in a chunk of 32 at a time, and the value should be contiguous from zero ("0") and up. Enumeration may be described as consisting of a set of named integer constants as described in the "C" programming language. In certain embodiments, the first 32 events are reserved for the lab debug purpose, and any one can use them as temporary events.

In certain embodiments, the error inject interpreter 170 reserves an indicator array (e.g., a bit array), one indicator for each event 160, to keep track of the arm state of the events 160. The corresponding indicator is on if the event 160 is armed. When the event macro 154 is invoked, the error inject interpreter 170 checks each indicator in this indicator array, and, if an indicator is set to "on", the error inject interpreter 170 analyzes the condition associated with that indicator.

The error inject interpreter 170 maintains relative timers to allow conditions to be set based on the time. In certain embodiments, a timer returns a TRUE condition on a predicate when the timer is expired; otherwise, the timer returns FALSE condition. In certain embodiments, the resolution of the timer defaults to 10 seconds, however, a different resolution may be specified. In certain embodiments, the resolution is not less than one second. In certain embodiments, a timer Task Control Block (TCB) may be used to schedule the timer update process with the specified frequency. A TCB may be described as an internal timer service on the storage controller 140.

Figure 10:
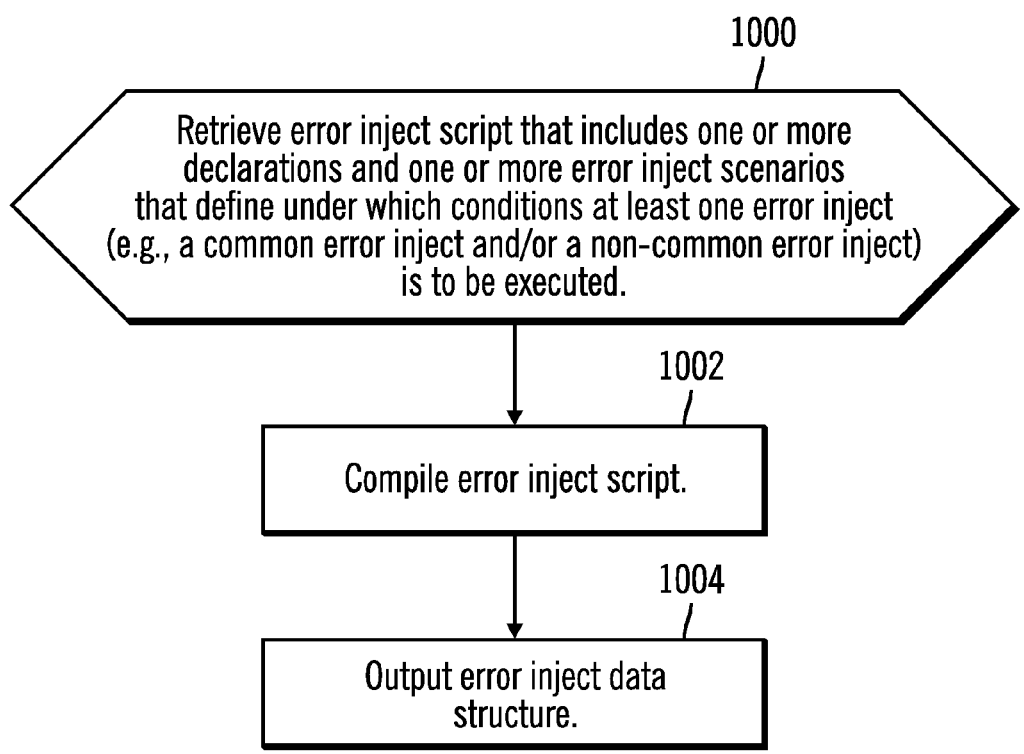
FIG. 10 illustrates logic performed by an error inject compiler in accordance with certain embodiments.

FIG. 10 illustrates logic performed by the error inject compiler 110 in accordance with certain embodiments. Control begins in block 1000 with the error inject compiler 110 retrieving an error inject script 120 that includes one or more declarations 122 and one or more error inject scenarios 124 that define under which conditions an error inject 180 (e.g., a common error inject 182 and/or a non-common error inject 184) is to be executed. In block 1002, the error inject compiler 110 compiles the error inject script 120. In block 1004, the error inject compiler 110 outputs the error inject data structure 130.

In certain embodiments, the error inject script 120 human-readable, while the error inject data structure 130 is consumed by the storage controller 140. That is, the data structure 130 is in a form that us usable by a computer.

Figure 11:
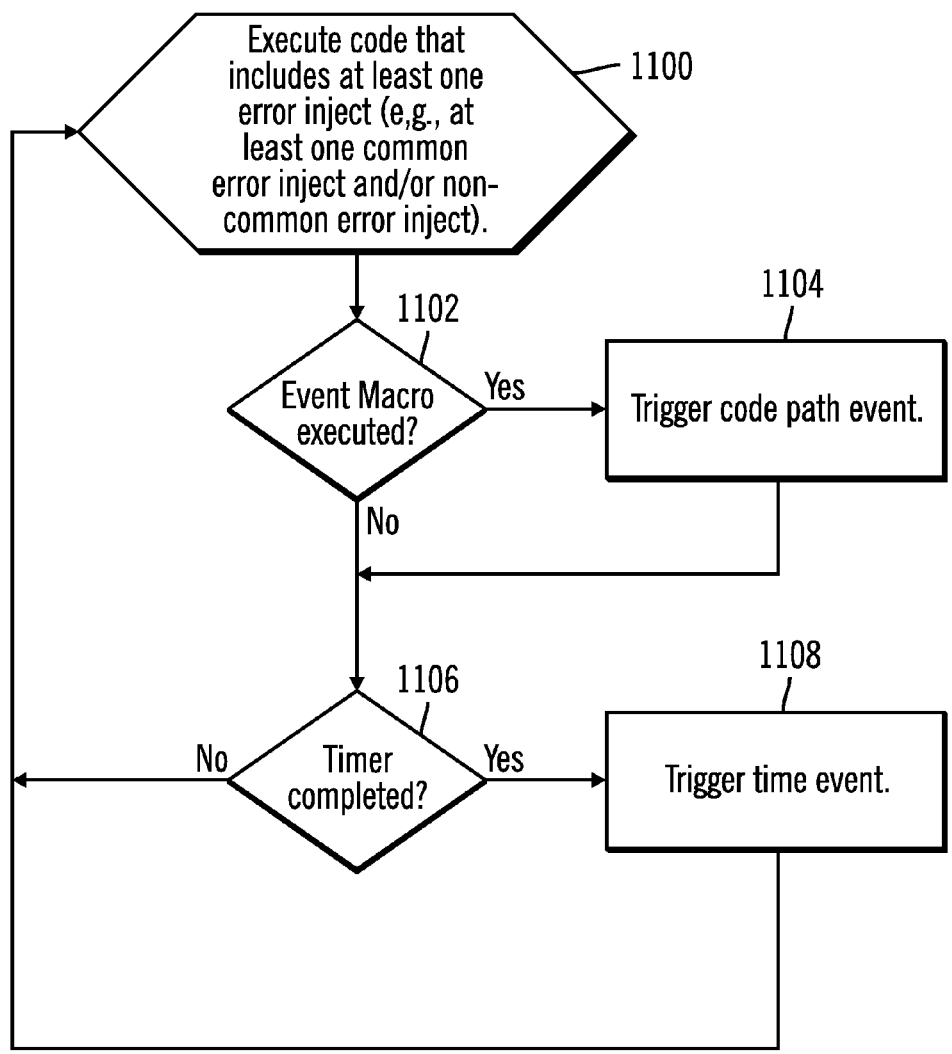
FIG. 11 illustrates logic to trigger an event in accordance with certain embodiments.

FIG. 11 illustrates logic to trigger an event in accordance with certain embodiments. Control begins in block 1100 with the storage controller 140 executing the executable code 156 that includes at least one error inject 180 (e.g., at least one common error inject 182 and/or non-common error inject 184). During execution, if an event macro 154' is reached (block 1102), processing continues to block 1104, otherwise, processing continues to block 1106. In block 1104, the event macro 154' generates a code path event 162. In block 1106, if a timer has completed (e.g., counted down to zero), then processing continues to block 1108, otherwise, processing loops back to block 1100 to continue executing the executable code 156. In block 1108, a time event 164 is generated.

Figure 12:
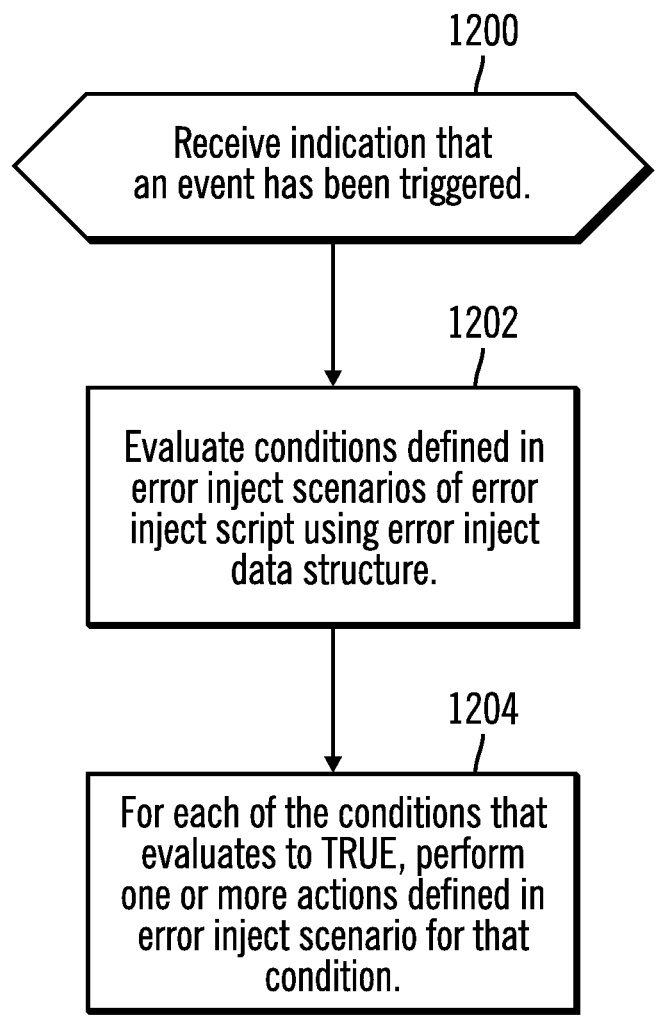
FIG. 12 illustrates logic performed by an error inject interpreter in accordance with certain embodiments.

FIG. 12 illustrates logic performed by the error inject interpreter 170 in accordance with certain embodiments. Control begins in block 1200 with the error inject interpreter 170 receiving an indication that an event 160 has been triggered (e.g., a code path event 162 or a time event 164). For example, when the executable code 156 is executing, and an event macro 154 in a code path 152 is reached, the event macro 154 notifies the error inject interpreter 170 of a code path event 162. As another example, if a timer counts down to zero, the error inject interpreter 170 receives an indication of such a time event 164.

In block 1202, the error inject interpreter 170 evaluates conditions 126 defined in the error inject scenarios 124 of the error inject script 120 using the error inject data structure 130. In block 1204, the error inject interpreter 170, for each of the conditions 126 that evaluates to TRUE, performs actions 128 defined in the error inject scenario 124 for that condition 126.

Thus, without driving the error inject scenarios 124, the code segments for inject locations and non-common injects 184 are executed. That is, the non-common error inject code 184 will not be accidentally executed because an event needs to trigger the execution. Also, there is no need to conditional compile the code segments for inject locations and non-common error injects 184 out. That is, because events 160 trigger execution of the non-common error injects 184, there is no need to remove the non-common error injects 184 and recompile the code 150. The error inject scenarios 124 and the common error injects 182 may be described by an error inject script 120 using the error inject specification language described herein. The error inject script 120 may be compiled and loaded to the storage controller 140 without recompiling and without restarting the storage controller 140.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter error inject scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 13:
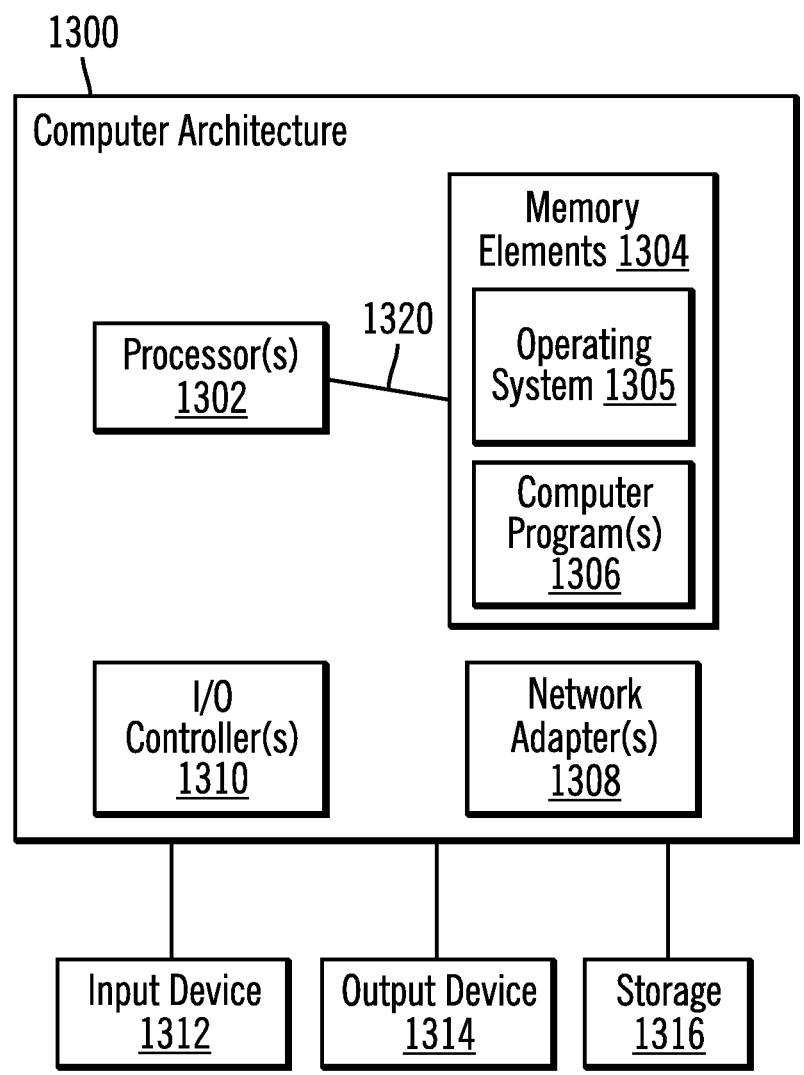
FIG. 13 illustrates a computer architecture that may be used in accordance with certain embodiments.

FIG. 13 illustrates a computer architecture 1300 that may be used in accordance with certain embodiments. Computing device 100 and/or storage controller 140 may implement computer architecture 1300. The computer architecture 1300 is suitable for storing and/or executing program code and includes at least one processor 1302 coupled directly or indirectly to memory elements 1304 through a system bus 1320. The memory elements 1304 may include local memory employed during actual execution of the program code, bulk storage, and cache memories which provide temporary storage of at least some program code in order to reduce the number of times code must be retrieved from bulk storage during execution. The memory elements 1304 include an operating system 1305 and one or more computer programs 1306.

Input/Output (I/O) devices 1312, 1314 (including but not limited to keyboards, displays, pointing devices, etc.) may be coupled to the system either directly or through intervening I/O controllers 1310.

Network adapters 1308 may also be coupled to the system to enable the data processing system to become coupled to other data processing systems or remote printers or storage devices through intervening private or public networks.

Modems, cable modem and Ethernet cards are just a few of the currently available types of network adapters 1308.

The computer architecture 1300 may be coupled to storage 1316 (e.g., a non-volatile storage area, such as magnetic disk drives, optical disk drives, a tape drive, etc.). The storage 1316 may comprise an internal storage device or an attached or network accessible storage. Computer programs 1306 in storage 1316 may be loaded into the memory elements 1304 and executed by a processor 1302 in a manner known in the art.

The computer architecture 1300 may include fewer components than illustrated, additional components not illustrated herein, or some combination of the components illustrated and additional components. The computer architecture 1300 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A system, comprising: a processor; and storage coupled to the processor, wherein the storage stores a computer program, and
   wherein the processor is configured to execute the computer program to perform operations, wherein the operations comprise:
   receiving an error inject script that includes a declaration that describes one or more events and an error inject scenario that describes conditions under which error injects are to be executed and associated one or more error inject actions, wherein the error injects comprise a common error inject and a non-common error inject, wherein the common error inject is a predefined error inject, and wherein the non-common error inject is a customized error inject;
   compiling the error inject script to output an error inject data structure that includes data elements corresponding to the one or more events and that includes the conditions and the associated one or more error inject actions; and while executing code that includes the error injects,
      in response to an event from the one or more events being triggered, evaluating the conditions in the error inject data structure associated with the event; and
      for a condition from the conditions that evaluates to true, performing the associated one or more error inject actions defined in the error inject script for the condition, wherein at least one of the error inject actions changes one of a state and a counter that causes another condition from the conditions to evaluate to true, and wherein the associated one or more error inject actions defined in the error inject script for the another condition are performed.

2. The system of claim 1, wherein the event that is triggered comprises a code path event and wherein the operations further comprise:
   reaching an event macro while executing code, wherein the event macro is a statement in the code that generates the code path event.

3. The system of claim 1, wherein the event that is triggered comprises a time event.

4. The system of claim 1, wherein the declaration defines programming elements that include one or more events, the counter, the state, a constant, and a timer.

5. The system of claim 1, wherein, when the error inject data structure is loaded into a storage controller, the storage controller activates the one or more events.

6. A computer program product comprising a non-transitory computer readable storage medium including a computer readable program, wherein the computer readable program when executed by a processor on a computer causes the computer to:
   receive an error inject script that includes a declaration that describes one or more events and an error inject scenario that describes conditions under which error injects are to be executed and associated one or more error inject actions, wherein the error injects comprise a common error inject and a non-common error inject, wherein the common error inject is a pre-defined error inject, and wherein the non-common error inject is a customized error inject;

compile the error inject script to output an error inject data structure that includes data elements corresponding to the one or more events and that includes the conditions and the associated one or more error inject actions; and while executing code that includes the error injects, in response to an event from the one or more events being triggered, evaluate the conditions in the error inject data structure associated with the event; and for a condition from the conditions that evaluates to true, perform the associated one or more error inject actions defined in the error inject script for the condition, wherein at least one of the error inject actions changes one of a state and a counter that causes another condition from the conditions to evaluate to true, and wherein the associated one or more error inject actions defined in the error inject script for the another condition are performed.

7. The computer program product of claim 6, wherein the event that is triggered comprises a code path event and wherein the computer readable program when executed by the processor on the computer causes the computer to:

reach an event macro while executing code, wherein the event macro is a statement in the code that generates the code path event.

8. The computer program product of claim 6, wherein the event that is triggered comprises a time event.

9. The computer program product of claim 6, wherein the declaration defines programming elements that include the one or more events, the counter, the state, a constant, and a timer.

10. The computer program product of claim 6, wherein, when the error inject data structure is loaded into a storage controller, the storage controller activates the one or more events.

* * * * *